Patented July 13, 1943

2,323,923

UNITED STATES PATENT OFFICE 2,323,923

VULCANIZATION OF RUBBER

Roger A. Mathes, Akron, Ohio, assignor to The B. F. Goodrich Company, New York, N. Y., a corporation of New York No Drawing. Application December 5, 1939, Serial No. 307,636

14 Claims. (Cl. 260—788)

This invention relates to the vulcanization of rubber and has as its object to provide a new and effective class of vulcanization accelerators.

I have discovered that amino methyl sulfides having the general structural formula

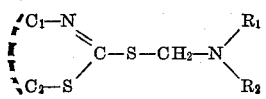

wherein $C_1$ and $C_2$ form part of a saturated alkylene chain, $R_1$ is a member of the class consisting of hydrogen and aliphatic radicals, and $R_2$ is a member of the class consisting of hydrogen, aliphatic and aromatic radicals are excellent accelerators for the vulcanization of rubber.

$C_1$ and $C_2$ are preferably joined with a single bond to form the thiazolinyl nucleus represented by the structural formula

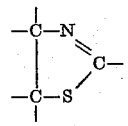

The free valences on the adjoining carbon atoms may be satisfied by hydrogen, thereby forming an unsubstituted thiazolinyl group

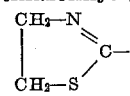

or by any of the groups represented by $R_2$, or may even form part of a saturated ring structure.

$R_1$ may be a methyl, ethyl, isopropyl, allyl, vinyl, cyclohexyl, benzyl, methoxymethyl, hydroxyethyl, aminoethyl, chlormethyl, or other alkyl cycloalkyl, aralkyl, hydroxyalkyl, alkoxyalkl, haloalkyl, or aminoalkyl group, while $R_2$ may be any of these groups or aromatic groups such as phenyl, tolyl, naphthyl, cumyl, cymyl, anthryl, phenanthryl, xenyl, anisyl, anilinophenyl, or similar groups. In the preferred compounds, $R_1$ and $R_2$ represent hydrogen or hydrocarbon groups.

Specific compounds within the class herein defined include

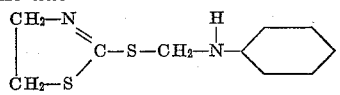

Thiazolinyl anilinomethyl sulfide,
Thiazolinyl diethylaminomethyl sulfide,
Thiazolinyl cyclohexylaminomethyl sulfide,
4-phenylthiazolinyl aminomethyl sulfide,
4,5-cyclotetramethylenethiazolinyl anilinomethyl sulfide,
4-methylthiazolinyl anilinomethyl sulfide,
4,5-dimethylthiazolinyl anilinomethyl sulfide, and

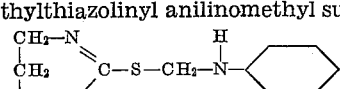

Penthiazolinyl anilinomethyl sulfide.

As a specific example of the method of this invention, the following compositions were prepared:

| Composition | I | II |
|---|---|---|
| Rubber | 100 | 100 |
| Zinc oxide | 5 | 5 |
| Sulfur | 3.5 | 3.5 |
| Thiazolinyl anilinomethyl sulfide | 1 | 1 |
| Lauric acid | 0 | 3 |

When these compositions were cured for varying times at 287° F., vulcanizates having the following properties were obtained, T representing tensile strength at break in lbs./in.$^2$ and E representing ultimate elongation in per cent:

| Composition | time of cure | T | E |
|---|---|---|---|
| | Minutes | | |
| I | 15 | 2,210 | 855 |
| I | 30 | 2,840 | 860 |
| II | 15 | 3,160 | 825 |
| II | 30 | 3,680 | 750 |

It will be noted that although the material tested is derived from mercaptothiazoline, which possesses very little activity as an accelerator in the absence of fatty acids, thiozolinyl anilinomethyl sulfide produces good cures in reasonable times in the absence of fatty acid. The accelerators of this invention are, accordingly, useful in the absence of fatty acid, although their activity is increased when some fatty acid is included in the composition.

It is to be understood that the specific examples given above are merely illustrative of one manner of the use of the accelerators of this invention; that other accelerators within the scope of the class herein defined may be substituted for the specific compounds used in the examples; that the accelerators of this invention may be used to vulcanize generally those rubbery materials which are capable of vulcanization with sulfur, including caoutchouc, balata, gutta percha, synthetic rubber, or natural or artificially prepared latex, all of which are herein designated by the generic term "a rubber"; that the accelerators may be incorporated in the rubber by mastication or milling, or in the case of latex or other dispersion or solution, by simply dissolving or suspending the accelerator therein; that the accelerators may be used in admixture with each other or with other known accelerators or with antioxidants, organic acids, amines, softeners, activators, retarders, pigments, fillers, etc.; and that the rubber may be vulcanized with the assitance of this new class of accelerators in heated molds, hot air, steam, hot water, etc. The accelerators of this invention may advantageously be used in as low a proportion as 0.05% of the rubber in the composition, in which case 3 to 5% of sulfur is generally required, or as high as 5%, with a much reduced quantity of sulfur.

This invention is accordingly not limited to the specific examples herein set forth, for it will be obvious to those skilled in the art that many modifications such as using other materials having equivalent properties and varying the proportions of materials used are within the spirit and scope of the invention as defined in the appended claims.

I claim:

1. The method which comprises vulcanizing a rubber in the presence of a material having the general structural formula $$\begin{pmatrix} C_1-N \\ \phantom{C_2-S} \end{pmatrix} C-S-CH_2-N \begin{matrix} R_1 \\ R_2 \end{matrix}$$

wherein $C_1$ and $C_2$ form part of a saturated alkylene chain, $R_1$ is a member of the class consisting of hydrogen and aliphatic radicals, and $R_2$ is a member of the class consisting of hydrogen, aliphatic, and aromatic radicals, the said radicals having their free valence on a carbon atom.

2. The method which comprises vulcanizing a rubber in the presence of a compound having the structural formula $$T-S-CH_2-N\begin{matrix}R_1\\R_2\end{matrix}$$

wherein T is a 2-thiazolinyl group and $$N\begin{matrix}R_1\\R_2\end{matrix}$$

is an amino group containing no substituents other than hydrocarbon radicals, not more than one of such substituent radicals being aromatic.

3. The method which comprises vulcanizing a rubber in the presence of thiazolinyl aminomethyl sulfide.

4. The method which comprises vulcanizing a rubber in the presence of a compound having the structural formula $$T-S-CH_2-N\begin{matrix}R_1\\R_2\end{matrix}$$

wherein T is a 2-thiazolinyl group, $R_1$ is an aliphatic hydrocarbon group and $R_2$ is a hydrocarbon group.

5. The method which comprises vulcanizing a rubber in the presence of a compound having the structural formula $$T-S-CH_2-N\begin{matrix}R_1\\R_2\end{matrix}$$

wherein T is a 2-thiazolinyl group, $R_1$ is hydrogen and $R_2$ is an aromatic group having its free valence on a carbon atom.

6. The method which comprises vulcanizing a rubber in the presence of a thiazolinyl arylaminomethyl sulfide.

7. The method which comprises vulcanizing a rubber in the presence of thiazolinyl anilinomethyl sulfide.

8. An unvulcanized but vulcanizable composition containing a rubber, a vulcanizing agent, and a material having the general structural formula $$\begin{pmatrix} C_1-N \\ \phantom{C_2-S} \end{pmatrix} C-S-CH_2-N \begin{matrix} R_1 \\ R_2 \end{matrix}$$

wherein $C_1$ and $C_2$ form part of a saturated alkylene chain, $R_1$ is a member of the class consisting of hydrogen and aliphatic radicals, and $R_2$ is a member of the class consisting of hydrogen, aliphatic, and aromatic radicals, the said radicals having their free valence on a carbon atom.

9. An unvulcanized but vulcanizable composition containing a rubber, a vulcanizing agent, and a compound having the structural formula $$T-S-CH_2-N\begin{matrix}R_1\\R_2\end{matrix}$$

wherein T is a 2-thiazolinyl group and $$N\begin{matrix}R_1\\R_2\end{matrix}$$

is an amino group containing no substituents other than hydrocarbon radicals, not more than one of such substituent radicals being aromatic.

10. An unvulcanized but vulcanizable composition containing a rubber, a vulcanizing agent, and thiazolinyl aminomethyl sulfide.

11. An unvulcanized but vulcanizable composition containing a rubber, a vulcanizing agent, and a compound having the structural formula $$T-S-CH_2-N\begin{matrix}R_1\\R_2\end{matrix}$$

wherein T is a 2-thiazolinyl group, $R_1$ is an aliphatic hydrocarbon group and $R_2$ is a hydrocarbon group.

12. An unvulcanized but vulcanizable composition containing a rubber, a vulcanizing agent, and a compound having the structural formula $$T-S-CH_2-N\begin{matrix}R_1\\R_2\end{matrix}$$

wherein T is a 2-thiazolinyl group, $R_1$ is hydrogen and $R_2$ is an aromatic group having its free valence on a carbon atom.

13. An unvulcanized but vucanizable composition containing a rubber, a vulcanizing agent, and a thiazolinyl arylaminomethyl sulfide.

14. An unvulcanized but vulcanizable composition containing a rubber, a vulcanizing agent, and thiazolinyl anilinomethyl sulfide.

ROGER A. MATHES.